United States Patent Office 3,634,375
Patented Jan. 11, 1972

3,634,375
ETHYLENE POLYMERIZATION WITH REDUCTION OR INTERRUPTION OF POLYMERIZATION
Wim Van der Linde and Jacob M. Smit, Geleen, Netherlands, assignors to Stamicarbon N.V., Heerlen, Netherlands
No Drawing. Filed Feb. 26, 1968, Ser. No. 707,959
Claims priority, application Netherlands, Mar. 1, 1967, 6703398
Int. Cl. C08f 1/06
U.S. Cl. 260—88.1 R
10 Claims

ABSTRACT OF THE DISCLOSURE

A process for preparing ethylene polymers by passing ethylene through a reactor under polymerization conditions is disclosed, wherein periodically the polymerization is reduced or interrupted, while passage of ethylene gas through the reactor is maintained, whereby polyethylene deposited on the reactor walls is dissolved. Higher ethylene conversion is obtained and the risk of an explosive decomposition of ethylene is reduced.

---

It is known to the prior art to prepare ethylene homopolymers or copolymers hereinafter called ethylene polymers, by continuously passing ethylene through a reactor, together, if so desired, with one or more compounds that are copolymerizable with ethylene, at a pressure of over 500 atm. and a temperature of between 100 and 400° C. and in the presence of an initiator which forms free radicals.

The above known process can be carried out by means of an autoclave provided with a stirrer or by means of a tubular reactor.

In both types of reactors polyethylene will deposit on the reactor wall in the long run. In the tubular reactor, in which the heat of polymerization has to be removed through the wall, the deposition is the stronger, and this has the drawback that the heat transfer becomes poorer. A consequence of this is that it is necessary to keep the conversion of ethylene into polyethylene comparatively low in order to prevent the formation of too high temperatures, at which an explosive decomposition of ethylene may occur. The deposition of polyethylene furthermore has the drawback that it hinders the flow of ethylene through the tube, as is shown by an increase in the pressure difference between the first and the last part of the tube; as a result, polyethylene with greater molecular weight distribution is formed because the polymerization conditions in the first and in the last part of the tube are widely different. If the tube is made longer in order to attain a higher conversion, this pressure differential phenomenon is aggravated. In addition, the quality of the polyethylene deposited on the wall differs from that of the non-deposited polyethylene; the final product will consequently contain inhomogeneities (fish eyes). This known process has the further drawback that, in order to prevent or reduce the formation of polyethylene deposits on the reactor walls, the difference in temperature between the wall of the tube and the cooling liquid must be kept comparatively small, so that the heat removal, and hence the conversion, is relatively low.

The present invention provides a process which eliminates at least one of the above drawbacks.

The process according to the present invention prepares ethylene homopolymers or copolymers by continuously passing ethylene through a reactor, together, if so desired, with one or more compounds that are copolymerizable with ethylene, at a pressure of over 500 atm. and a temperature of between 100 and 400° C., in the presence of an initiator which forms free radicals, and is characterized in that the polymerization is interrupted or reduced for certain periods, whereas the passage of ethylene through the reactor is continued.

The ethylene which is passed through the reactor during the periods of interrupted or reduced polymerization, hereinafter called flushing periods has such a temperature that the polyethylene deposited on the reactor wall can dissolve in it. Generally, the ethylene passing through the reactor during the flushing period will have a temperature of 150 to 200° C., preferably 180 to 220° C. If so desired, the ethylene leaving the reactor during the flushing periods may be passed into another reactor in order to be polymerized.

The ratio between the duration of the flushing periods and that of the polymerization periods depends on the specific polymerization conditions, such as the nature of the initiator, the pressure, the temperature, the diameter of the reactor, etc., and may vary within very wide limits. This ratio of flushing periods to polymerization periods usually lies between 1 to 100 and 1 to 1, and preferably between 1 to 20 and 1 to 4. The duration of the polymerization periods to be used also depends on many conditions and may vary over wide limits. Usually relatively short periods will be preferred, e.g. between 1 and 60 minutes and more preferably between 12 and 24 minutes, to prevent polyethylene deposited on the wall from having too long a retention time in the reactor. The longer this deposited polyethylene stays in the reactor, the more difficult it becomes to dissolve.

The flushing period and the polymerization period may be made to alternate at regular intervals, e.g., may be controlled by a timer. It is also possible to make the beginning of a flushing period, and the intensity and the duration of flushing, dependent on the degree of polyethylene deposition in the tube. Consequently, it is possible to measure the pressure in the first part and in the last part of the tube and have a flushing period start, if the difference between the pressures of these two parts exceeds a given predetermined value which depends on the length and the diameter of the tube. In addition, the degree of polyethylene deposition can also be measured by the temperature of the tube. Consequently, a flushing period is preferably made to start as soon as the temperature in any place in the tube reaches a given predetermined value. This temperature control of the flushing period has the advantage that the chance of explosive decompositions of ethylene automatically becomes exceedingly small, because, when the temperature rises, a flushing period will start, so that the temperature cannot continue to rise.

The simplest measure for ensuring that reduced or no polymerization takes place during a flushing period is to interrupt or temporarily reduce the initiator feed. Another possibility is to add to the reactor during a flushing period a substance that fully or partly suppresses the polymerization, e.g. an excess amount of a radical trap, e.g. phenolic antioxidants. By preference, an additional amount of ethylene containing no or less initiator is passed through the reactor. This can be done comparatively easily if two or more tubular reactors have been connected in parallel and, during a flushing period of one of the reactors, part of the ethylene flow from one or more of the other reactors is passed through the reactor being flushed.

Most preferably, however, a flushing period is made to start by reduction of the initiator feed. It is advantageous not to completely stop the initiator feed during a flushing period, as thus the polymerization can be maintained at a low level, so that it is not necessary to re-initiate the polymerization reaction after termination of a flushing period. Preferably, the initiator feed will be reduced by 60–95%.

The process according to the invention has the advantage that the temperature differential between the tube wall and the usual cooling liquid can be made considerably larger, because there is no longer any risk of permanent deposition of polyethylene on the wall. If so desired, the cooling liquid may also be omitted, so that the cooling is effected simply by means of the ambient air. In such cases, the temperature differential will be at least 50° C. and preferably at least 100° C. If use is made of a cooling liquid, the flow of this liquid may, if so desired, be interrupted during a flushing period to ensure that the temperature remains high enough during the flushing period. Naturally the heating of the first part of the tubular reactor must preferably remain on during a flushing period to keep the temperature of the ethylene sufficiently high. The process according to the invention may advantageously be applied to the process according to the non-published United States patent application Ser. No. 704,271 in which use is made of a tubular reactor, the heating zone of which has been replaced by an autoclave reactor.

The process according to the invention can also be used for the preparation of copolymers of ethylene and other unsaturated compounds e.g. acrylic acid, methacrylic acid, and esters, e.g., methyl and ethyl esters, e.g., mono- and di-substituted amides with lower alkyl, etc., substituents, of these acids, and vinyl esters of saturated carboxylic acids, such as vinyl acetate, and mixtures thereof. Preferably, at least 70% by weight of ethylene will be contained in copolymers.

In the process according to the invention the pressure may vary between 500 and 10,000 atm. Usually, however, the pressure is 1000–4000 atm, and preferably 1500–3000 atm.

The reaction temperature generally lies between 100 and 400° C., but preferably, dependent on the initiator used, between 150 and 300° C. Chain-transfer agents and other customary additions, such as lubricants, antistatic agents, antioxidants, etc., may be present during the polymerization.

The initiator used may be any of the conventional free-radical sources, e.g. oxygen or peroxy compounds, e.g. lauroyl peroxide, capryloyl peroxide di-(tertiary butyl) peroxide, benzoyl peroxide, tertiary butyl perbenzoate, etc. In the tubular reactor, however, use is prefably made of oxygen.

The length of the tubular reactor is normally 250–40,000 times the diameter. It is not necessary to feed all ethylene into the first part of the reactor. Part of the ethylene may also be fed in at one or more places farther downstream. This has the advantage that the conversion can be raised still further. In general, however, this is not necessary in the present invention. If so desired, the contents of the tubular reactor may also be subjected to periodic pressure pulses to effect a better equalization of temperature, so that the chance of explosive decompositions and clogging becomes smaller. It will be clear that in the present invention it will generally not be necessary to apply this pressure-pulse treatment very intensively, since the chance of explosive decompositions and clogging is quite remote.

EXAMPLE I (PRIOR ART)

Use is made of a continuously operating polymerization unit of the following arrangement.

(a) Compression section

Ethylene is compressed to a pressure of 1000–2000 atm. at the rate of 20 kg./h. by means of diaphragm compressors.

(b) Reaction section

Use is made of a tubular reactor consisting of 70 m. of stainless-steel high-pressure tube, inner diameter 5 mm., outer diameter 14 mm., which is fitted with a jacket that is suitable for a pressure of 30 atm. gauge. The required amount of $O_2$ initiator, is supplied to the reactor feed. The pressure in the tubular reactor is controlled by means of a control valve in the discharge conduit.

(c) Product removal

After passing the control valve, the mixture leaving the reactor, which mixture consists of polyethylene and unconverted ethylene, is reduced to a pressure of 200 atm. gauge, which causes demixing. The product released is then degassed further, extruded, cooled, and chopped. A mixture of 18 kg. of ethylene and 0.42 kg. of propane is added to the reactor per hour at a temperature of 60° C. 1.0 g. of $O_2$ is added to this mixture per hour. The polymerization pressure is 1600 atm. A cooling liquid at 210° C. circulates through the reactor jacket. 2.54 kg. of polyethylene is obtained per hour, which means an ethylene conversion of 14.1%. The product has a density of 0.919 g./cm.$^3$ and a melt index of 9.1 dg./min.

EXAMPLE II

The polymerization unit used in Example I is used in this example except that, the $O_2$ injection is controlled by means of a timed control mechanism so that $O_2$ is injected for 14 minutes, then interrupted for 1 minute, then again injected for 14 minutes, and so on.

The ethylene conversion is 17.9%. The product has a density of 0.923 g./cm.$^3$ and a melt index of 4.1 dg./min.

EXAMPLE III

The polymerization is carried out as described in Example II except that the temperature of the cooling liquid in the reactor jacket is 150° C. This causes the conversion to rise to 20.1%.

EXAMPLE IV

Example III is repeated, except that the polymerization pressure is 2200 atm. and that the $O_2$ injection is periodically reduced to 0.2 g. per hour during the 1 minute periods. The conversion is 19.7%.

EXAMPLE V

The experiment of Example II is repeated, except that the cooling jacket of the tubular reactor is removed, so that the reactor tube is air-cooled (ambient air at 27° C.). The conversion further rises to 22.3%.

What is claimed is:

1. In a process for preparing ethylene polymers by continously passing ethylene through a reactor, together, when preparing ethylene copolymers, with at least one monomer compound which is copolymerizable with ethylene, said ethylene copolymer containing at least 70% ethylene by weight, at a pressure of at least 500 atmospheres, at a temperature between 100° C. and about 400° C., and in the presence of an initiator which forms free radicals, the improvement comprising periodically interrupting or reducing by at least 60% the polymerization of the ethylene while maintaining the passage of ethylene monomer through the reactor, wherein the ratio of the interval when polymerization is interrupted or reduced to the interval when polymerization is unaffected is between 1 to 100 and 1 to 1 and wherein there is at least one interval where the polymerization is interrupted or reduced about every 1 to 60 minutes, whereby deposition of the polyethylene on the reactor wall is eliminated or reduced.

2. The process as claimed in claim 1, wherein the polymerization is interrupted or reduced by reducing the initiator feed by 60 to 95%.

3. The process as claimed in claim 1 wherein said interval ratio is between 1 to 20 and 1 to 4.

4. The process as claimed in claim 1 wherein polymerization is conducted in a tubular reactor.

5. The process as claimed in claim 4 wherein a cooling medium surrounds said tubular reactor and the temperature differential between the reactor wall and the cooling medium is at least 100° C.

6. The process as claimed in claim 5 wherein the cooling is medium ambient air.

7. The process as claimed in claim 1 wherein there is at least one interval wherein polymerization is interrupted or reduced about every 60 minutes.

8. The process as claimed in claim 4 wherein the interval of interrupted or reduced polymerization is controlled by the pressure differential across at least a portion of the tubular reactor.

9. The process as claimed in claim 1 wherein the interval of interrupted or reduced polymerization is controlled by the reactor tube temperature.

10. In a process for preparing ethylene polymers by continuously passing ethylene through a reactor, together, when preparing ethylene copolymers, with at least one monomer compound which is copolymerizable with ethylene and said copolymer contains at least 70% ethylene, at a pressure of at least 500 atmospheres, at a temperature between about 100° C. and about 400° C., and in the presence of an initiator which forms free radicals, the improvement comprising periodically flushing the polymerization zone with unreacted ethylene by maintaining the passage of ethylene monomer through the reactor, while interrupting or reducing by at least 60% the polymerization of the ethylene wherein the ratio of the interval when polymerization is interrupted or reduced to the interval when polymerization is unaffected is between 1 to 100 and 1 to 1 and wherein there is at least one interval where the polymerization is interrupted or reduced about every 1 to 60 minutes, whereby deposition of the polyethylene on the reactor wall is eliminated or reduced.

References Cited
UNITED STATES PATENTS 3,108,094  10/1963  Morgan _____ 260—94.9
3,177,184  4/1965   Cottle _____ 260—88.2

JOSEPH L. SCHOFER, Primary Examiner

S. M. LEVIN, Assistant Examiner

U.S. Cl. X.R.

260—80.73, 80.81, 86.7, 87.3, 94.9 P, 94.9 R